(12) United States Patent
Kumazawa et al.

(10) Patent No.: US 6,490,090 B1
(45) Date of Patent: Dec. 3, 2002

(54) COLORING STRUCTURE FOR PRODUCING COLOR

(75) Inventors: Kinya Kumazawa, Kanagawa (JP); Hiroshi Tabata, Yokohama (JP); Masahiko Yamanaka, Kanagawa (JP); Toshihiko Sada, Kanagawa (JP)

(73) Assignees: Nissan Motor Co., Ltd., Yokohama (JP); Tanaka Kikinzoku Kogyo K.K., Tokyo (JP); Teijin Limited, Osaka (JP)

( * ) Notice: Subject to any disclaimer, the term of this patent is extended or adjusted under 35 U.S.C. 154(b) by 0 days.

(21) Appl. No.: 09/513,853

(22) Filed: Feb. 25, 2000

(30) Foreign Application Priority Data

Feb. 26, 1999 (JP) ............................. 11-050491

(51) Int. Cl.$^7$ ............................. G02B 1/10; G02B 5/22; B44C 5/08
(52) U.S. Cl. .................. 359/580; 359/584; 359/586; 359/589; 359/885; 428/38; 428/207
(58) Field of Search ............................. 359/580, 584, 359/586, 589, 885; 428/229, 37, 38, 690, 207

(56) References Cited

U.S. PATENT DOCUMENTS

| | | | |
|---|---|---|---|
| 3,711,176 A | | 1/1973 | Alfrey, Jr. et al. ............... 350/1 |
| 4,514,459 A | | 4/1985 | Nakagawa et al. ......... 428/229 |
| 4,595,634 A | | 6/1986 | Gordon ...................... 428/428 |
| 5,008,143 A | * | 4/1991 | Armanini .................... 428/207 |
| 5,073,008 A | * | 12/1991 | Terashita et al. ............ 359/589 |
| 5,407,738 A | | 4/1995 | Tabata et al. ............... 428/229 |
| 5,472,798 A | | 12/1995 | Kumazawa et al. ........ 428/690 |
| 5,571,624 A | * | 11/1996 | Phillips et al. .............. 359/580 |
| 5,849,383 A | | 12/1998 | Kumazawa et al. .......... 428/38 |

FOREIGN PATENT DOCUMENTS

| | | |
|---|---|---|
| EP | 0 926272 | 6/1999 |
| JP | 43-14185 | 6/1968 |
| JP | 59-228042 | 12/1984 |
| JP | 60-24847 | 6/1985 |
| JP | 62-170510 | 7/1987 |
| JP | 63-120642 | 5/1988 |
| JP | 63-64535 | 12/1988 |
| JP | 1-139803 | 6/1989 |
| JP | 4-202805 | 7/1992 |
| JP | 6-17349 | 1/1994 |
| JP | 7-34320 | 2/1995 |
| JP | 7-34324 | 2/1995 |
| JP | 7-97766 | 4/1995 |
| JP | 7-97786 | 4/1995 |
| JP | 7-166430 | 6/1995 |
| JP | 7-195603 | 8/1995 |
| JP | 7-331532 | 12/1995 |

OTHER PUBLICATIONS

Teruko Yoshimoto et al., "Depth Perception and Accommodation of the Human Eye," 5$^{th}$ Symposium on Human Interface, Oct. 25–27, 1989, Kyoto, pp. 175–178.

* cited by examiner

Primary Examiner—Audrey Chang
(74) Attorney, Agent, or Firm—Foley & Lardner

(57) ABSTRACT

A coloring structure includes a surface layer placed on a base with light transparency and containing transparent brilliant members, each brilliant member including an alternate lamination of at least two polymers having different refractive indexes, and controlling interfered light resulting from reflection and interference produced by the alternate lamination and transmitted light other than interfered light and passing through the alternate lamination. The brilliant members may dispersedly be contained in the base.

18 Claims, 6 Drawing Sheets

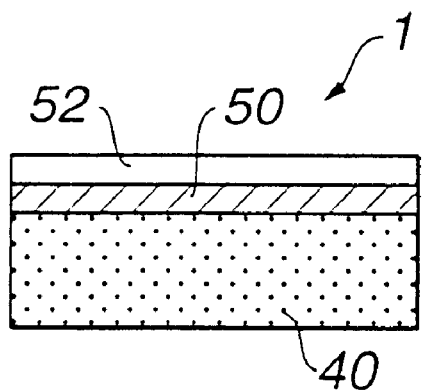
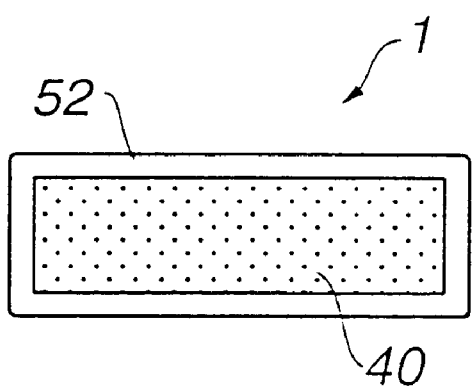
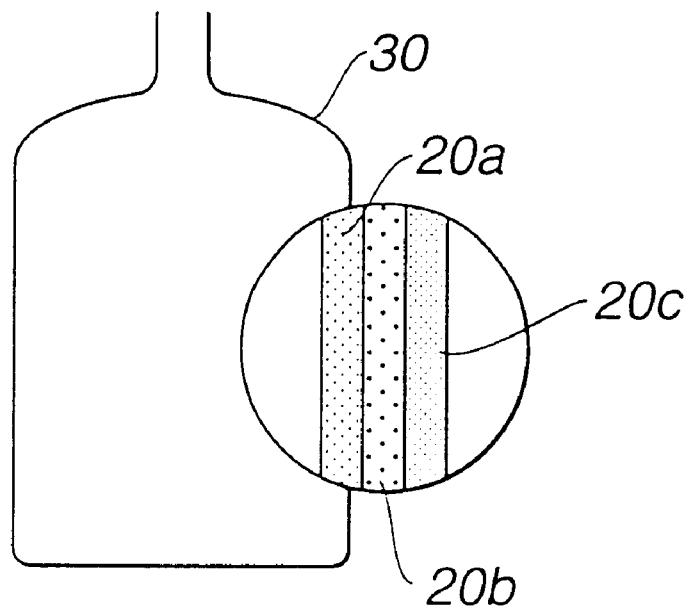

COLORING STRUCTURE FOR PRODUCING COLOR

BACKGROUND OF THE INVENTION

The present invention relates to a light-transmitting material that is formable in any flattened shapes such as plate-like, sheet-like and film-like shapes, and is applicable, for example, to motor vehicles, architectures and everyday items. More particularly, the present invention relates to a coloring structure for producing a color, which has not only an excellent visual quality with hue varying with the angle, depth and profundity, but a high design quality due to considerable hue difference between when seeing the structure from the side of an incident-light source and when seeing it from the side opposite thereto.

Generally, final coating for motor vehicles is in the form of a solid-color, metallic-color or pearl-color coating. The solid-color coating produces a predetermined tint by a color pigment. The metallic-color coating contains a color pigment and fine aluminum pieces to provide not only a color of the color pigment, but a design quality with sparkle due to irregular reflection of light produced by the aluminum pieces. The pearl-color coating includes a color-base coating and a transparent mica-base paint containing mica pieces applied thereon to provide not only sparkle like the metallic-color coating generated under the action of light reflected by a mica-base coating and light reflected by the color-base film, but softer reflected light than that of the metallic-color coating due to interference by the mica pieces. Recently, the use of special mica allows creation of a design quality with iridescence having hue varying with the angle.

Moreover, in the areas of containers, office-automation apparatus and home-appliance panels, a three-layer structure is provided, having a colored base layer, a pearl-mica layer and a transparent skin layer placed in this order so as to obtain a surface ornament for press-blow, blow-injection and babble-blow moldings.

SUMMARY OF THE INVENTION

As described above, there is a wide diversity of the design quality of various industrial goods in recent years. Under such circumstances, the development of new materials is demanded to enable a surface structure with novel design quality that is different from the metallic-color and pearl-color coatings.

It is, therefore, an object of the present invention to provide a coloring structure for producing a color, which has not only an excellent visual quality with hue varying with the angle, depth and profundity, but a high design quality due to considerable hue difference between when seeing the structure from the side of an incident-light source and when seeing it from the side opposite thereto.

One aspect of the present invention lies in providing a coloring structure, comprising:

a base with light transparency;

a layer placed on at least part of said base; and transparent brilliant members contained in said layer, each brilliant member including an alternate lamination of at least two polymers having different refractive indexes, each brilliant member controlling interfered light resulting from reflection and interference produced by said alternate lamination and transmitted light other than said interfered light and passing through said alternate lamination, whereby the coloring structure is provided with a coloring mechanism for producing at least an interference color resulting from reflection and interference of an incident source spectrum produced by said brilliant members, a first transmitted color resulting from transmission of said incident source spectrum through said brilliant members, and a second transmitted color resulting from transmission of said incident source spectrum through said base and said layer without striking any brilliant members.

Another aspect of the present invention lies in providing a coloring structure, comprising:

a base with light transparency; and transparent brilliant members dispersedly contained in said layer, each brilliant member including an; alternate lamination of at least two polymers having different refractive indexes, each brilliant member controlling interfered light resulting from reflection and interference produced by said alternate lamination and transmitted light other than said interfered light and passing through said alternate lamination, whereby the coloring structure is provided with a coloring mechanism for producing at least an interference color resulting from reflection and interference of an incident source spectrum produced by said brilliant members, a first transmitted color resulting from transmission of said incident source spectrum through said brilliant members, and a second transmitted color resulting from transmission of said incident source spectrum through said base without striking any brilliant members.

BRIEF DESCRIPTION OF THE DRAWINGS

FIGS. 7A–7C are views similar to FIGS. 6A–6H, showing further structural examples of the coloring structure.

DETAILED DESCRIPTION OF THE INVENTION

Figure 1A:
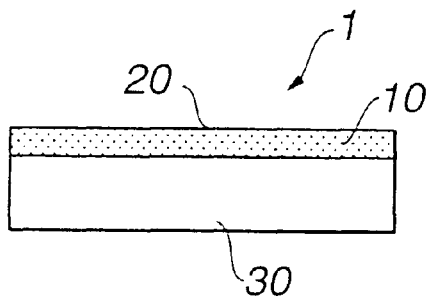
FIG. 1A is a sectional view showing a first fundamental form of a coloring structure for producing a color, which embodies the present invention.
Figure 1B:
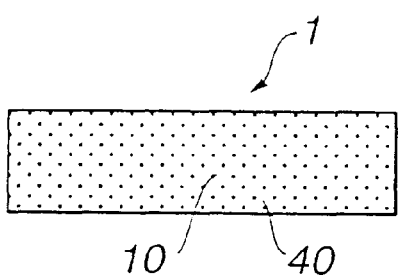
FIG. 1B is a view similar to FIG. 1A, showing a second fundamental form of the coloring structure.

Referring to FIGS. 1A–1B, an inventive coloring structure 1 for producing a color is constructed fundamentally in two different forms. One form is as shown in FIG. 1A, including a base 30 with light transparency and a surface layer 20 placed thereon and containing a predetermined concentration of transparent brilliant members 10. Each brilliant member 10 includes an alternate or regularly repeated lamination of at least two polymers having different refractive indexes as will be described later. It controls interference light resulting from reflection and interference produced by the lamination and transmitted light other than interference light. Another form is as shown in FIG. 1B, including a base 40 with light transparency and the transparent brilliant members 10 appropriately dispersed therein.

In the first form of the coloring structure 1 including the base 30 and the surface layer 20 as shown in FIG. 1A, the base 30 may be glass or resins such as polyethylene, acrylic, polycarbonate and polyethylene terephthalate. The base 30 may be other materials on condition that they have light transparency in the region of visible light (wavelengths of 380 to 780 nm). The materials may not necessarily be achromatic and transparent, but semitransparent or colored. Moreover, the materials may be paper or cloth. The base 30 may be formed in various shapes such as film-like and plate-like shapes including a concave/convex and a curved surface.

The surface layer 20 placed on the base 30 and containing the brilliant members 10 may be paint, ink or adhesive. It is noted that the ink-type surface layer. 20 is obtained by printing, and the adhesive-type surface layer 20 is disposed between the bases 30 of the same type or different types. Moreover, the surface layer 20 may include a resin film put on the base 30.

Coating of paint containing the brilliant members 10 is carried out, preferably, by using a spray that is excellent in efficiency. Alternately, other known coating means may be adopted such as dip, brush, roller, flow and spin coatings.

The second form of the coloring structure 1 including the base 40 and the brilliant members 10 dispersed therein as shown in FIG. 1B is available when a material or polymer of the brilliant members 10 provides predetermined properties such as heat resistance and heat contraction. In this case, the brilliant members 10 are directly injected and mixed into a resin of the base 40. The coloring structure 1 in the second form is-shaped in a panel, a sheet or a film. It can also be formed in a desired shape by using the known resin forming means such as injection molding, extrusion molding and blow molding to mix the brilliant members 10 when forming various resin moldings with light transparency. The base 40 is not limited to a resin, and may be paper or unwoven cloth including the brilliant members 10 mixed in fibers.

Figure 1C:
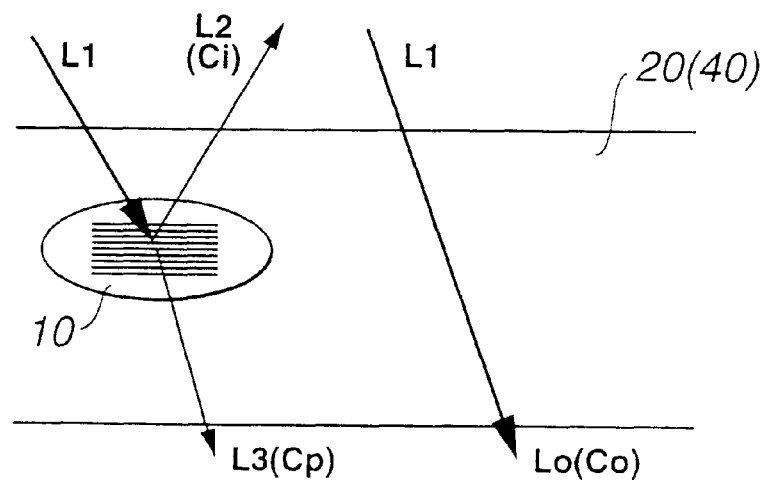
FIG. 1C is a schematic view showing a coloring mechanism of the coloring structure.

Referring to FIG. 1C, the presence of the brilliant members 10 contained in the surface layer 20 or, the base 40 makes light incident thereon, i.e. incident source spectrum L1, exit from the surface layer 20 or the base 40 via substantially two optical paths. One optical path is divided into two parts, one of which is pertinent to a reflected/interfered light L2 that is one part of the light L1 that is reflected by the brilliant member 10 dispersedly contained in the surface layer 20 or the base 40 and exits; to the incident side of the light L1, another of which is pertinent to a transmitted light L3 that is the other part of the light L1 that passes through the brilliant member 10 and exits on the side opposite to the incident side. Another optical path is pertinent to a transmitted light Lo that exits directly on the side opposite to the incident side without striking the brilliant member 10. The reflected/interfered light L2 has an interference color Ci of wavelength determined by the structural characteristics, such as material and dimension, of the lamination of the brilliant member 10. The transmitted light L3 is a remainder of the light L1 with phase controlled and with the reflected/interfered light L1 removed, and shows hue of very high purity in the same way as the reflected/interfered light L2.

Thus, when seeing the coloring structure 1 from the incident side of the source spectrum L1, we principally perceive the interference color Ci. On the other hand, when seeing the coloring structure 1 from the side opposite to the incident side, we perceive a mixture of a through transmitted color Cp resulting from the transmitted light L3 that exits through the brilliant member 10 and a direct transmitted color Co resulting from the transmitted light Lo that exits directly without striking the brilliant member 10. This results in a considerable hue difference between when seeing the coloring structure 1 from the incident side of the source spectrum L1 and when seeing it from the side opposite thereto.

In order to clarify a singularity of the brilliant member 10 of the coloring structure 1, the known pearl-mica pigments will be described shortly. With the pearl-mica pigments, in order to maximize the hiding power, semitransparent or non-transparent mica as a base is coated with titanium dioxide or the like, which is often covered with a metallic layer. In the case of the semitransparent pearl-mica pigment, incident light is partly absorbed or reflected by the pigment, and mostly exits therefrom as transmitted light, which is low both in intensity and in purity. On the other hand, in the case of the non-transparent pearl-mica pigment, incident light is mostly absorbed or reflected by the pigment, an,d hardly exits therefrom, resulting in higher hiding power. However, the small number of the lamination of the base does not allow sufficiently high reflection intensity, failing to provide a sufficiently strong interference color. It is noted that the greater quantity of light passing trough the pearl-mice pigment, the smaller the hiding power thereof is.

The brilliant member 10 does not aim to increase the hiding power by coating a semitransparent or non-transparent base with titanium dioxide or the like, but to minimize it. The brilliant member 10 includes an alternate lamination of at least two transparent polymers, and makes full use of both coloring due to reflection and interference of light (interference color) and coloring due to transmission of light other than reflection and interference thereof (transmitted color) to improve the design a nd ornamental qualities.

Referring to FIG. 1C, the light L1 incident on the brilliant member 10 travels generally in the two optical paths as described above. One part of the light L1 enters the alternate lamination of the brilliant member 10 to produce the interference color Ci resulting from reflection and interference of light. Another part of the light L1 passes through the brilliant member 16 due to the fact that the brilliant member 10 is a transparent body, forming the transmitted light L3 of high purity. Action of the two parts of the light L1 plays an important role in providing the novel coloring structure 1 having a visual quality with high brilliancy, hue varying with the angle, profundity and transparency.

When seeing the surface layer 20 placed on the base 30 with light transparency and containing the brilliant members 10 or the base 40 with light transparency containing the brilliant members 10 from the incident side of the source spectrum L1, we perceive the strong interference color Ci resulting from the reflected/interfered light L2 obtained reflection and interference produced by the brilliant members 10. On the other hand, when seeing either from the side opposite to the incident side, we perceive a mixture of the through transmitted color Cp resulting from the transmitted light L3 passing through the brilliant member 10 and the direct transmitted color Co resulting from the transmitted light Lo exiting directly from the base 30 or 40 without striking the brilliant member 10, which shows hue different from that of the interference color Ci. In actuality, in addition to coloring due to those lights L2, L3, Lo, there exists coloring due to light outgoing via complex paths made by repetition of reflection and interference produced by several brilliant members 10, which contributes to a complex hue change. As being attenuated every reflection, interference and transmission, such outgoing light plays a relatively small role in a hue change, and the interference color Ci and the transmitted colors Cp, Co play a dominant role therein.

The brilliant member 10 not only produces interfered and transmitted lights, but controls them. Such control includes an arbitrary change both in intensity of interfered and transmitted lights (i.e. reflection intensity of interfered light and transmission intensity of transmitted light) and in peak wavelength of the reflection and transmission spectra, and concerns a kind of conversion of light intensity and wavelength. The convertible range of light intensity and wavelength is widened by the measures depicted, for example, in claim 4, wherein the alternate lamination of the brilliant member 10 includes a layer containing one of the achromatic and chromatic coloring matters.

Moreover, when the brilliant member 10 includes no coloring-matter layer and when seeing it from the incident side of the source spectrum L1 as described above, we perceive a very transparent tone peculiar to the interference color Ci resulting from the reflected/interfered light L2 obtained reflection and interference produced by the brilliant member 10. On the other hand, when seeing the brilliant member 10 to the side opposite to the incident side, we perceive a transparent tone with different hue from the interference color due to mixture of the transmitted light L3 with no interference color and the transmitted light Lo that exits directly on the side opposite to the incident side without striking the brilliant member 10.

Figure 2:
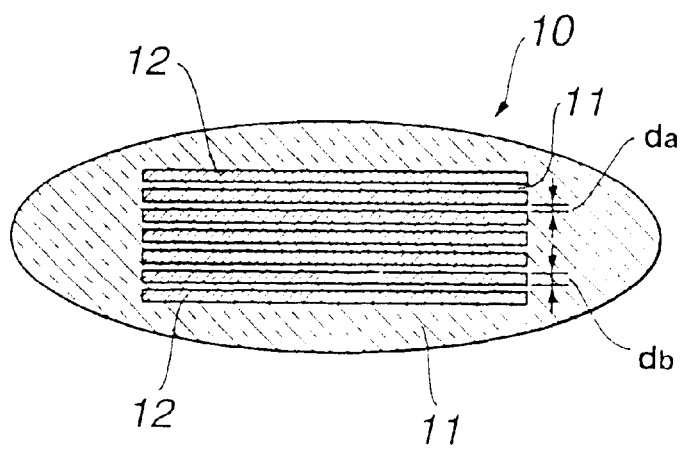
FIG. 2 is a enlarged section showing a transparent brilliant member as shown in FIG. 1C.

Referring to FIG. 2, the brilliant member 10 has a section as shown in FIG. 2, including therein an alternate lamination of two polymers 11, 12, for example. Suppose that the refractive indexes of the polymers 11, 12 are na and nb, and that the thicknesses of the two are da and db. In order to obtain desired coloring or an interference color of wavelength $\lambda 1$, the following conditions should be satisfied: When $na \geq 1.3$, and $1.01 \leq nb/na \leq 1.40$, a primary reflection peak wavelength $\lambda 1$ is given by $\lambda 1 = 2(nada + nbdb)$.

Determination of the primary reflection peak wavelength $\lambda 1$ to satisfy such conditions allows not only generation of hues covering all color ranges of violet-green-red, but achievement of the very strong interference color Ci. Among the above conditions, the condition of $na \geq 1.3$ results from the material characteristics of the polymers 11, 12. The condition of $1.01 \leq nb/na$ results from the practical manufacturing condition with respect to formation of the alternate lamination of two polymers and the really visually recognizable level of tone in the region of visible light. And the condition of $nb/na \leq 1.40$ also results from the manufacturing condition with respect to formation of the -alternate lamination of two polymers. In particular, when the optical thicknesses (=refractive index×thickness) of two polymer layers are the same, i.e. nada=nbdb, the greatest reflectance R is obtained.

The polymers 11, 12 of the brilliant member 10 may be resins including polyester, polyacrylonitrile, polystyrene, nylon, polypropylene, polyvinyl alcohol, polycarbonate, polyethylene naphthalate, polyethylene terephthalate, polymethyl methacrylate, polyether etherketone, polyparaphenylene terephthal amide, polyphenylene sulfide, etc., or their copolymer resins or blended resins, among which two or more resins with different refractive indexes are selected for application.

Although the number of alternate polymer layers of the brilliant member 10 is not limited to a specific number, it is, preferably, 5 or more, particularly, 10 to 150 in view of the optical function (reflection and interference, and transparency) and the manufacture. It is noted that when applying three polymers or more, the repeated lamination of the polymers is needed in a predetermined order and without changing the order.

The brilliant members 10 including such alternate lamination can be obtained by forming an alternate-lamination workpiece in accordance with the known multi-layer forming method, and then flaking off or slicing it. The manufacturing method may be selected from physical depositions such as vacuum or electron deposition, ion plating and molecular beam epitaxy, treating methods such as casting, spin coat, plasma polymerization and Langmuir-Blodgett technique, and spinning methods such as melt spinning, wet spinning and dry spinning. Among them, the melt spinning method, which has excellent productivity and allows low manufacturing cost, is particularly suited for manufacture of the brilliant members 10. With the melt spinning method, continuous or yarn-like alternate-lamination workpieces can be obtained by using a melt composite spinning apparatus with a special spinneret for forming an alternate lamination. The workpieces are subjected to drawing treatment to obtain desired sections, then cut to predetermined lengths for diverse applications.

With the coloring structure 1, a binder for the surface layer 20 containing the brilliant members 10 and a material of the base 40 containing the brilliant members 10 or a dispersion medium for them are selected non-exclusively from materials with light transparency, and, preferably, from resins with excellent coating performance and film formability. Such resins may be acrylic, alkyd, polyester, polyurethane and amino resins, and isocyanate compounds. A solvent for dissolving or diffusing the resins and a hardener may be one of the paint solvents in general use, which may be toluenen, xylene, butyl acetate, methyl acetate, methyl ethyl ketone, methyl isobutyl ketone, butyl alcohol, aliphatic hydrocarbon and aromatic hydrocarbon. Moreover, water can be used for solventless paint. There is no particular limitation on the solvent.

With the coloring structure 1, the, brilliant member 10 may contain not only a known pigment such as pearl-mica or organic or inorganic pigment concurrently, but a previously applied additive agent such as dispersing agent, plasticizer or surface regulator. However, adding of the pearl-mica or the organic or inorganic pigment is, preferably, avoided due to, possible occurrence of muddiness or cloudiness of hue.

In view of the reflection and interference effect, the transparency and the coating performance, the content of the brilliant members 10 in the coloring structure 1 is determined, as depicted, for example, in claim 2, such that the surface layer 20 or the base 40 contains 0.1–30.0% brilliant members 10 by weight. Specifically, if the content of the brilliant members 10 is smaller than 0.1%, few coloring elements exist in the coloring structure 1, resulting in difficult achievement of hue varying with the angle, depth and profundity. On the other hand, if the content is greater than 30%, the pigment concentration exceeds a value set for conventional coating films and resin products, having a tendency to exert a bad influence on the properties of the coating film such as spread performance when obtaining the surface layer 20 by coating, and on the formability, wear resistance and impact characteristics of moldings when obtaining the base 40 by directly injecting and mixing therein the brilliant members 10.

Figure 3A:
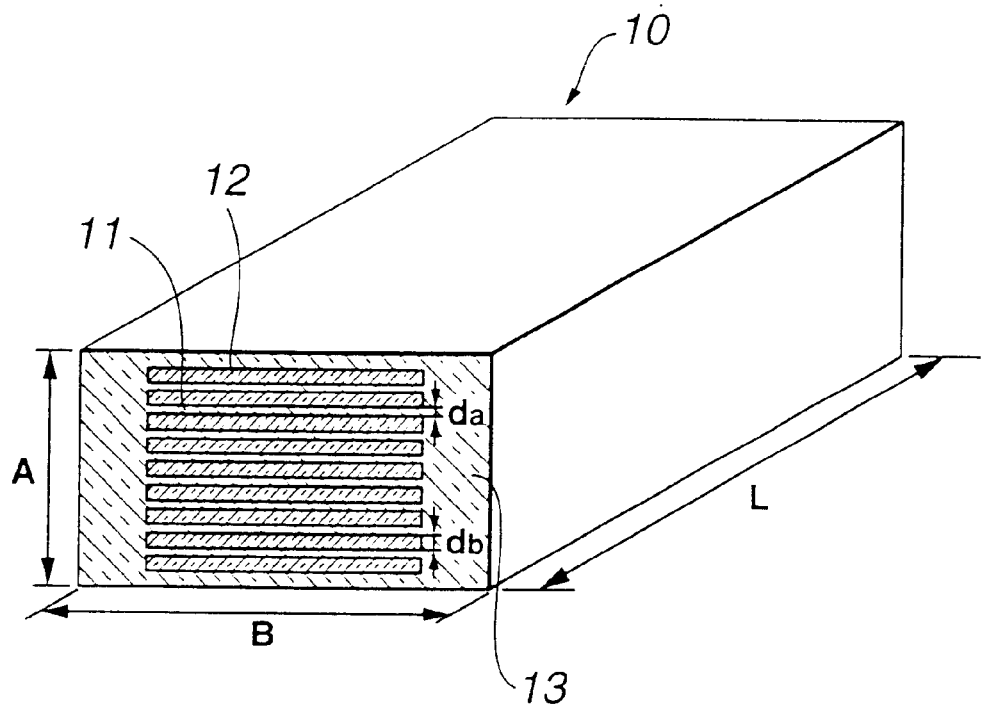
FIGS. 3A–3B are perspective views showing examples of the outer structure the brilliant member.

Referring to FIG. 3A, though the outer structure of the brilliant member 10 is not limited to a specific structure, it includes, preferably, a clad 13 arranged around the alternate lamination of the two polymers 11, 12 and including one of the polymers 11, 12 or a third polymer different therefrom in view of the improvement in mechanical strength such as prevention of peeling and wear resistance of the alternate lamination and in stability of luster and reflection intensity. Alternatively, referring to FIG. 3B, a double clad 14 may be arranged, which includes a combination of the polymers 11, 12, i.e. the first polymer 11 and the second polymer 12 arranged therearound.

The shape of the brilliant member 10 is determined, preferably, as depicted, for example, in claim 6, such that the brilliant member 10 is of a substantially rectangular section as shown in FIG. 3A, wherein suppose that a length A of a side of the section perpendicular to the surface of the alternate lamination is 1, a length B of a side of the section parallel to the surface is between 0.8 and 25.0, and a length L of the brilliant member 10 is between 0.8 and 4,000. This allows full achievement of both coloring due to reflection and interference of light and coloring due to transmission of light without deteriorating the productivity of the brilliant members 10 when obtaining the surface layer 20 by coating, and the formability thereof when obtaining the base 40 by directly injecting and mixing therein the brilliant members 10.

Specifically, if the ratio of the length B to the length A, and the ratio of the length L to the length A are both smaller than 0.8, the brilliant member 10 has a low probability that the coloring surface points in the direction of incident light when forming the surface layer 20 containing the brilliant members 10 on the base 30 or another surface layer, resulting in insufficient coloring effect due to reflection and interference of light. If the ratio of the length B to the length A is greater than 25, there will arise a problem during manufacture (e.g. melt composite spinning) of the brilliant members 10, resulting in impossible stable acquisition of the brilliant members 10 for ensuring reflection or transmission of light of a desired wavelength. If the ratio of the length L to the length A is greater than 4,000, a spray gun may be clogged with the brilliant members 10 during coating, resulting in impossible implementation of normal coating.

As described above, the coloring structure 1 has two fundamental forms as shown in FIGS. 1A–1B, one including the base 30 and the surface layer 20 placed thereon and containing the brilliant members 10, and another including the base 40 and the brilliant members 10 dispersedly contained therein. Alternately, the coloring structure 1 can be realized in other forms so as to make more remarkable and singular coloring due to reflection and interference of light and coloring due to transmission of light.

Figure 4A:
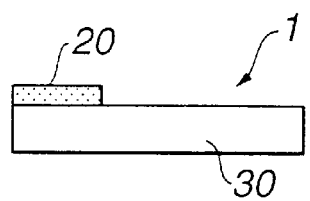
FIGS. 4A–4J are views similar to FIG. 2 showing structural examples of the coloring structure.
Figure 4B:
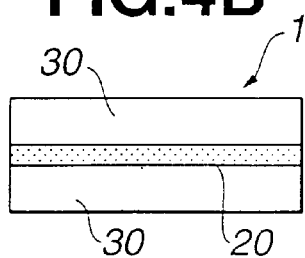

By way of example, referring to FIG. 4A, with the coloring structure 1 including the base 30 and the surface layer 20 placed thereon, the surface layer 20 may be arranged on all the surface of the base 40 or on part of the surface as shown in FIG. 4A. Moreover, the surface layer 20 may be arranged on the base 30 to form a letter or a pattern. Moreover, referring to FIG. 4B, the surface layer 20 may be interposed between two bases 30.

Figure 4C:
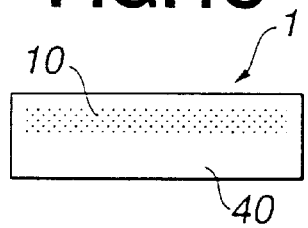
Figure 4D:
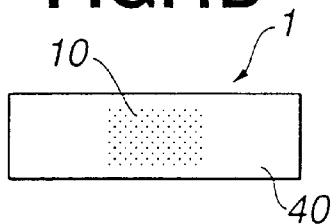

Referring to FIGS. 4C–4D, with the coloring structure 1 including the base 40 and the brilliant, members 10 dispersedly contained therein, the brilliant members 10 may be dispersed equally in the whole base 40 or concentratedly in the surface, the underside or a predetermined spot of the base 40 as shown in FIGS. 4C–4D.

Figure 4E:
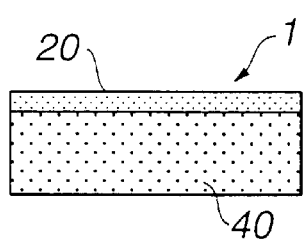
Figure 4F:
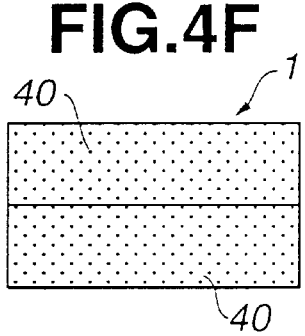

Referring to FIGS. 4E–4F, the surface layer 20 containing the brilliant members 10 may be arranged on the base 40 containing the brilliant members 10 as shown in FIG. 4E, or two or more bases 40 may be superimposed one upon another as shown in FIG. 4F. Such forms are preferable in view of achievement of deeper and more complex coloring of the coloring structure 1.

Figure 4G:
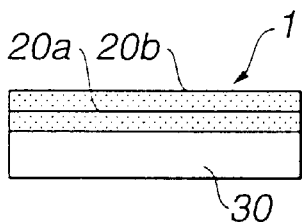
Figure 4H:
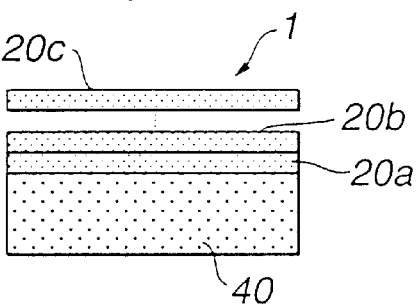

Referring to FIGS. 4G–4H, a plurality of surface layers 20a, 20b, 20c may be arranged on the base 30 or 40, which allows achievement of not only the thick surface when a thick surface layer is difficult to be formed in one coating process, but greater profundity. The depth of the coloring structure 1 when seeing it 1 from the surface layer 20 is increased by making the brilliant member 10 contained in the second surface layer 20b placed on the first surface layer 20a longer than the brilliant member 10 contained in the first surface layer 20a.

With the coloring structure 1 including a plurality of surface layers 20, the brilliant members 10 contained in the surface layers 20a, 20b, 20c are designed to produce different interference colors as depicted, for example, in claim 8. This allows production of a mixed color different from a color of the known coloring structure including pearl-mica or organic or inorganic pigments, and having not only hue varying with the angle, depth, profundity and transparency, but a considerable hue difference between when seeing the color from the side of an incident-light source and when seeing it from the side opposite thereto.

Specifically, referring to FIG. 4G, the coloring structure 1 includes the base 30, the first surface layer 20a placed on the base 30 and containing the brilliant members 10G designed to produce a green interference color, and the second surface layer 20b placed on the first surface layer 20a and containing the brilliant members 10B designed to produce a blue interference color. When white light of the source spectrum L1 is incident to the second surface layer 20b to strike the brilliant members 10B contained therein, blue interfered light exits on the incident side, and transmitted light other than blue interfered light exits on the side of the base 30b through the first surface layer 20a. This transmitted light shows yellow orange, since blue of interfered light is removed from while light of the source spectrum L1, i.e. a complementary or opposite color is produced based on the additive mixture of three primary colors of light. When transmitted light passes through the brilliant members 10G contained in the first surface layer 20a, green is removed from the light, and orange light exits outward of the base 30. Moreover, when the source spectrum L1, which passes through the second surface layer 20b, is incident to the first surface layer 20a to strike the brilliant members 10G contained therein, green interfered light exits on the incident side, and transmitted light other than green interfered light exits on the side of the base 30. This transmitted light shows red.

Thus, when seeing the coloring structure 1 from the incident side of the source spectrum L1, we perceive a mixed color of blue and green, i.e. cyan or sky blue. On the other hand, when seeing it from the side opposite to the incident side or from the side of the base 30, we perceive a mixed color of yellow orange, orange and red. This results in production of a considerable hue difference between the two sides. It is noted that this is a case where the intensities of lights out of the brilliant members 10G, 10B contained in the surface layers 20a, 20b are substantially the same. Adjustment of the light intensities allows arbitrary control of hue, lightness and saturation.

The coloring structure 1 as shown in FIG. 4G includes two surface layers 20a, 20b, alternately, it may include three or more surface layers.

Moreover, several kinds of brilliant members 10 producing different interfered colors can dispersedly be contained in one surface layer 20 or one base 40. It is noted that when each surface layer 20 contains the brilliant members 10 producing blue, green and red interference colors, i.e. it constitutes a coloring layer of three primary colors of light, proportional equalization of the intensities of lights resulting from the three produces white light.

Figure 4I:
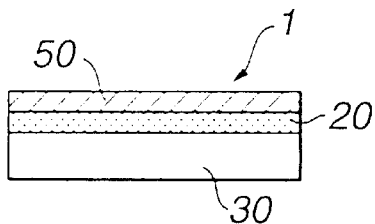
Figure 4J:
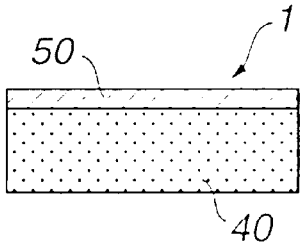

Referring to FIGS. 4I–4J, the coloring structure 1 may include a colored layer 50 containing a pearl-mica or organic or inorganic pigment and placed on the surface layer 20 containing the brilliant members 10 as shown in FIG. 4I or on the base 40 containing the brilliant members 10 as shown in FIG. 4J. in this case, when the source spectrum L1 is on the side of the colored layer 50 and when seeing the coloring structure 1 from the side of the colored layer 50, we principally perceive hue resulting from the colored layer 50. And when seeing the coloring structure 1 from the side of the base 30 or 40, even though lightness is slightly lower than that when seeing it from the colored layer 50, we perceive delicate hue due to a mixture of hue resulting from the colored layer 50 and interference color resulting from the brilliant members 10.

On the other hand, when the source spectrum L1 is on the side of the base 30 or 40 and when seeing the coloring structure 1 from the side of the base 30 or 40, we perceive a transparent, brilliant and deep mixture of hue resulting from the colored layer 50 itself, interference color resulting from reflections and interference produced by the brilliant members 10, hue resulting from the colored layer 50 subjected to light passing through the brilliant members 10, object color resulting from the colored layer 50 directly subjected to the source spectrum L1, etc.

With the coloring structure 1, as depicted, for example, in claim 4, the alternate lamination of the brilliant member 10 may include a layer containing one of the achromatic and chromatic coloring matters. This allows control of the transmission intensity or transmittance of light passing through the brilliant member 10 and the peak wavelength in the transmission spectrum. It is noted that the achromatic colors are colors without hue but with only lightness of the three attributes of the color (hue, lightness and saturation), including white, gray and black. On the other hand, the chromatic colors are colors other than the achromatic colors and with the three attributes of the color.

Figure 5:
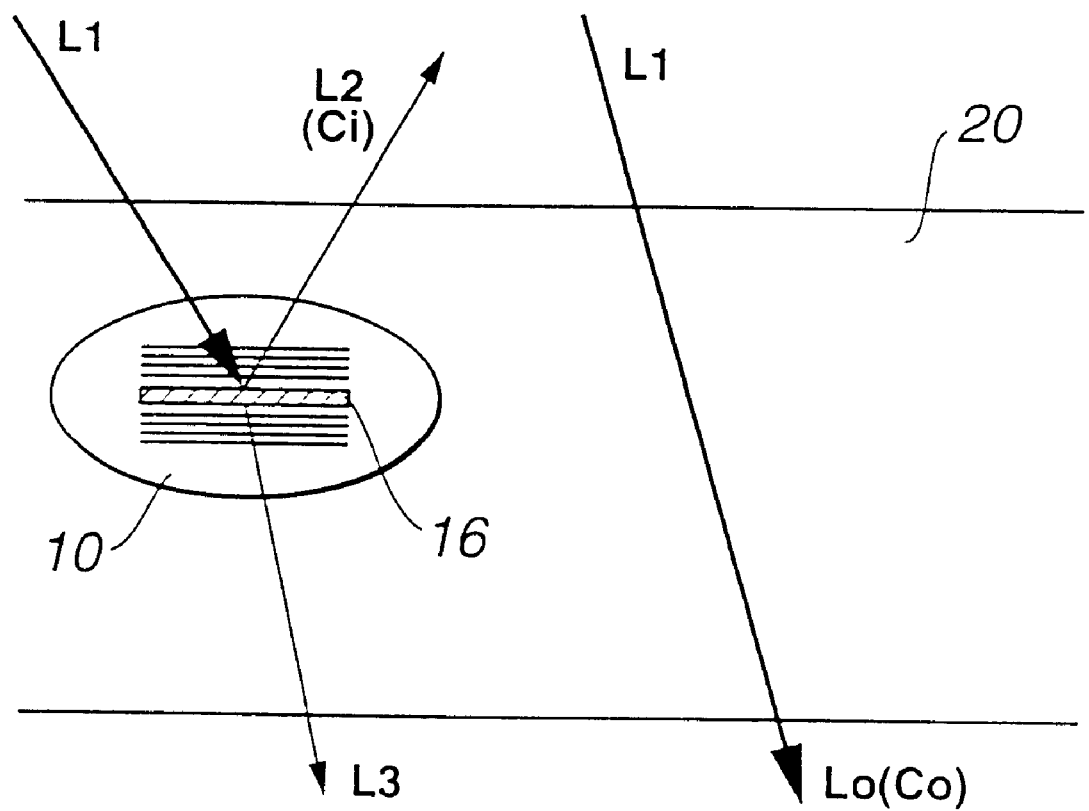
FIG. 5 is a view similar to FIG. 1C, showing the coloring mechanism of the coloring structure including a coloring-matter layer in the brilliant member.

FIG. 5 shows a coloring mechanism of the coloring structure 1 including the surface layer 20 containing the brilliant members 10 each with a stray-light absorbing layer 16 arranged in the alternate lamination and including an achromatic or black coloring matter for absorbing 50% incident light. The incident light L1 is partly reflected by the brilliant member 10, which forms the reflected/interfered light L2, producing the interference color Ci. Light other than the reflected/interfered light L2 is about 50% absorbed by the stray-light absorbing layer 16, and the remainder of which exits as the transmitted light L3 from the surface layer 20. In this case, light other than the reflected/interfered light L2, i.e. transmitted light L3, has a wavelength preserved on the whole due to the stray-light absorbing layer 16, and a transmission intensity lowered.

Specifically, with the transmittance being controlled by the stray-light absorbing layer 16 when passing through the brilliant member 10, light exits outward of the base 30. Thus, the transmittance can variously be controlled by changing the kind, grain size, concentration or content, etc. of the achromatic coloring matter, obtaining controllable lightness and saturation.

The coloring mechanism of the coloring structure 1 using the brilliant members 10 each with a layer arranged in the alternate lamination and including a chromatic coloring matter is fundamentally the same as that of the coloring structure 1 including an achromatic-coloring-matter layer except that the wavelength of the transmitted light L3 varies. Specifically, the incident light L1 is partly reflected by the brilliant member 10 including the chromatic-coloring-matter layer, which forms the reflected/interfered light L2, producing the interference color Ci. Light other than the reflected/ interfered light L2 is absorbed with respect to light of a predetermined wavelength by the chromatic-coloring-matter layer, and the remainder of which exits as the transmitted light L3. Thus, the wavelength of light other than the reflected/interfered light differs from that of light exiting from the chromatic-coloring-matter layer, i.e. wavelength conversion is carried out.

Referring to FIGS. 6A–7B and 4G–4J, the coloring structure 1 may include a layer 52 with light transparency placed on the outermost surface, i.e. the surface layer 20 placed on the base 30 or the base 40 containing the brilliant members 10 as shown in FIGS. 6A–7B, or the second or third surface layer 20b or 20c as shown in FIGS. 4G–4H, or the colored layer 50 as shown in FIGS. 4I–4J. This allows an increase in luster and durability of the coloring structure 1.

Figure 6A:
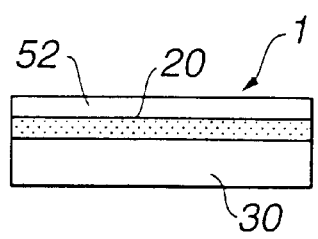
FIGS. 6A–6H are views similar to FIGS. 4A–4J, showing other structural examples of the coloring structure.
Figure 6B:
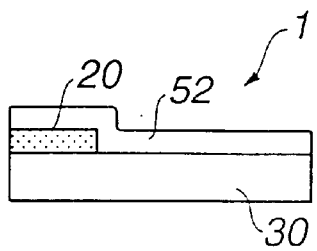
Figure 6C:
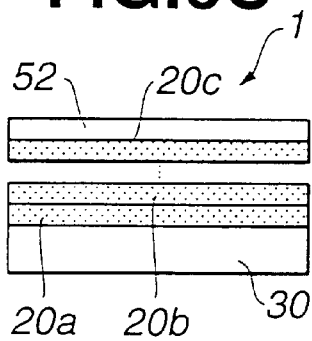
Figure 6D:
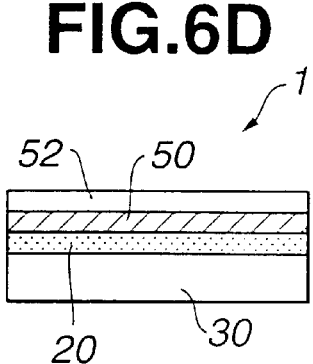
Figure 6E:
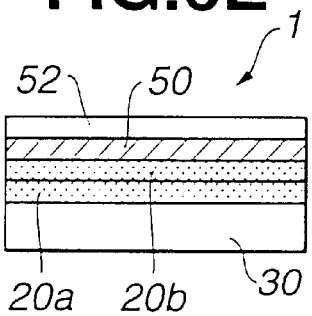
Figure 6F:
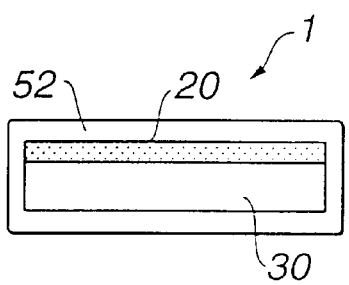
Figure 6G:
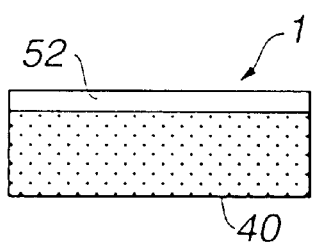
Figure 6H:
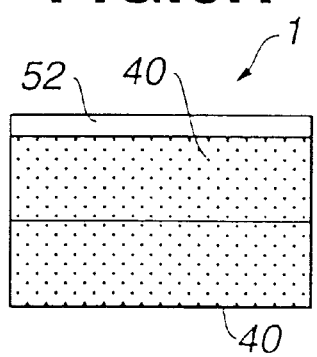

The layer 52 with light transparency can be obtained by applying clear paint, for example. Moreover, the layer 52 can be obtained by the known method of placing or pressing a transparent or semitransparent film or sheet. Moreover, heat fusion and application of an adhesive are available. Further, the layer 52 may be formed around the base 30 and the surface layer 20 as shown in FIG. 6F or around the base 40 as shown in FIG. 7B.

Referring to FIG. 7C, the coloring structure 1 may be formed in a predetermined shape by blow molding, including one or more surface layers 20a, 20b, 20c placed on the base 30 and containing the brilliant members 10.

The coloring structure 1 will be described in detail with regard to Examples 1–5.

EXAMPLE 1

Example 1 is pertinent to the coloring structure 1 as shown in FIG. 1A. Using polyethylene naphthalate (PEN) of 1.63 refractive index as the first polymer 11 and nylon 6 (Ny-6) of 1.53 refractive index as the second polymer 12, the alternate lamination of the polymers 11, 12 of 30 layers each is formed, which is surrounded by the clad 13 of PEN. Thus, the brilliant member 10 as shown in FIG. 3A is obtained, which produces blue as an interference color and wherein the thickness da of the first polymer 11 is equal to 0.072 $\mu$m, and the thickness db of the second polymer 12 is equal to 0.077 $\mu$m. The dimensional ratio of the brilliant member 10 is determined such that suppose that the length A of the side perpendicular to the surface of the alternate lamination of the polymers 11, 12 is 1, the length B of the side parallel to the surface is between 4 and 5, and the length L is between 15 and 20.

Paint is prepared by mixing the brilliant members 10 in a two-liquid acrylic-urethane base paint known under the trade name of "R-241 Base" manufactured by NIPPON BEE CHEMICAL, CO., LTD. to have 10 weight % with respect to the entire coating film. The paint prepared in such a way is diluted with an acrylic-urethane thinner known under the trade name of "T-801 Thinner" manufactured by NIPPON BEE CHEMICAL, CO., LTD. to have an about 11–12 sec. viscosity in terms of Ford cup #4. The diluted paint is applied on a polyethylene-terephthalate (PET) film having 200 μm thickness and 87% average transmittance in the visible-light region and cleaned with isopropyl alcohol to have a 15–20 μm thickness, which is subjected to baking during 20 min. at 80° C. to form the surface layer 20 placed on the PET film as the base 30 with light transparency and containing the brilliant members 10, obtaining the coloring structure 1 as shown in FIG. 1A.

EXAMPLE 2

Example 2 is also pertinent to the coloring structure 1 as shown in FIG. 1A. Using PEN of 1.63 refractive index as the first polymer 11 and Ny-6 of 1.53 refractive index as the second polymer 12, the alternate lamination of the polymers 11, 12 of 30 layers each is formed, which is surrounded by the clad 13 of PEN. Thus, the brilliant member 10 as shown in FIG. 3A is obtained, which produces blue as an interference color and wherein the thickness da of the first polymer 11 is equal to 0.072 μm, and the thickness db of the second polymer 12 is equal to 0.077 μm. The dimensional ratio of the brilliant member 10 is determined such that suppose that the length A of the side perpendicular to the surface of the alternate lamination of the polymers 11, 12 is 1, the length B of the side parallel to the surface is between 4 and 5, and the length L is between 3,000 and 4,000.

In the same way as Example 1, paint is prepared by mixing the brilliant members 10 in the two-liquid acrylic-urethane base paint known under the trade name of "R-241 Base" manufactured by NIPPON BEE CHEMICAL, CO., LTD. to have 10 weight % with respect to the entire coating film. The paint prepared in such a way is diluted with the acrylic-urethane thinner known under the trade name of "T-801 Thinner" manufactured by NIPPON BEE CHEMICAL, CO., LTD. to have an about 11–12 sec. viscosity in terms of Ford cup #4. The diluted paint is applied on a PET film having 200 μm thickness and 87% average transmittance in the visible-light region and cleaned with isopropyl alcohol to have a 15–20 μm thickness, which is subjected to baking during 20 min. at 80° C. to form the surface layer 20 placed on the PET film as the base 30 with light transparency and containing the brilliant members 10, obtaining the coloring structure 1 as shown in FIG. 1A.

EXAMPLE 3

Example 3 is also pertinent to the coloring structure 1 as shown in FIG. 1A. Using PET of 1.58 refractive index as the first polymer 11 and Ny-6 of 1.53 refractive index as the second polymer 12, the alternate lamination of the polymers 11, 12 of 30 layers each is formed, which is surrounded by the clad 13 of PET. Thus, the brilliant member 10 as shown in FIG. 3A is obtained, which produces blue as an interference color and wherein the thickness da of the first polymer 11 is equal to 0.074 μm, and the thickness db of the second polymer 12 is equal to 0.077 μm. The dimensional ratio of the brilliant member 10 is determined such that suppose that the length A of the side perpendicular to the surface of the alternate lamination of the polymers 11, 12 is 1, the length B of the side parallel to the surface is between 4 and 5, and the length L is between 15 and 20.

In the same way as Example 1, paint is prepared by mixing the brilliant members 10 in the two-liquid acrylic-urethane base paint known under the trade name of "R-241 Base" manufactured by NIPPON BEE CHEMICAL, CO., LTD. to have 10 weight % with respect to the entire coating film. The paint prepared in such a way is diluted with the acrylic-urethane thinner known under the trade name of "T-801 Thinner" manufactured by NIPPON BEE CHEMICAL, CO., LTD. to have an about 11–12 sec. viscosity in terms of Ford cup #4. The diluted paint is applied on a PET film having 200 μm thickness and 87% average transmittance in the visible-light region and cleaned with isopropyl alcohol to have a 15–20 μm thickness, which is subjected to baking during 20 min. at 80° C. to form the surface layer 20 placed on the PET film as the base 30 with light transparency and containing the brilliant members 10, obtaining the coloring structure 1 as shown in FIG. 1A.

EXAMPLE 4

Example 4 is pertinent to the multi-layer coloring structure 1 as shown in FIG. 4G, which includes the first surface layer 20a producing green interfered light and the second surface layer 20b producing blue interfered light placed on the base 30 with light transparency. Using PET of 1.58 refractive index as the first polymer 11 and Ny-6 of 1.53 refractive index as the second polymer 12, the alternate lamination of the polymers 11, 12 of 30 layers each is formed, which is surrounded by the clad 13 of PET. Thus, the brilliant members 10G, 10B as shown in FIG. 3A are obtained. The brilliant member 10G to be contained in the first surface layer 20a and producing green as an interference color is such that the thickness da of the first polymer 11 is equal to 0.087 μm, and the thickness db of the second polymer 12 is equal to 0.090 μm. The brilliant member 10B to be contained in the second surface layer 20b and producing blue as an interference color is such that the thickness da of the first polymer 11 is equal to 0.077 μm, and the thickness db of the second polymer 12 is equal to 0.074 μm. The dimensional ratio of each brilliant member 10G, 10B is determined such that suppose that the length A of the side perpendicular to the surface of the alternate lamination of the polymers 11, 12 is 1, the length B of the side parallel to the surface is between 4 and 5, and the length L is between 15 and 20.

In the same way as Example 1, two paint are prepared by mixing the brilliant members 10G, 10B in the two-liquid acrylic-urethane base paint known under the trade name of "R241 Base" manufactured by NIPPON BEE CHEMICAL, CO., LTD. to have 10 weight % with respect to the entire coating film. Each paint prepared in such a way is diluted with the acrylic-urethane thinner known under the trade name of "T-801 Thinner" manufactured by NIPPON BEE CHEMICAL, CO., LTD. to have an about 11–12 sec. viscosity in terms of Ford cup #4. The first diluted paint containing the brilliant members 10G is applied on a PET film having 200 μm thickness and 87% average transmittance in the visible-light region and cleaned with isopropyl alcohol to have a 15–20 μm thickness, which is subjected to baking during 20 min. at 80° C. to form the first surface layer 20a placed on the PET film as the base 30 with light transparency and containing the brilliant members 10G. Likewise, the second diluted paint containing the brilliant members 10B is applied on the first surface layer 20a to form the second surface layer 20b placed on the first surface layer 20a and containing the brilliant members 10B, obtaining the coloring structure 1 as shown in FIG. 4G.

EXAMPLE 5

Figure 3B:
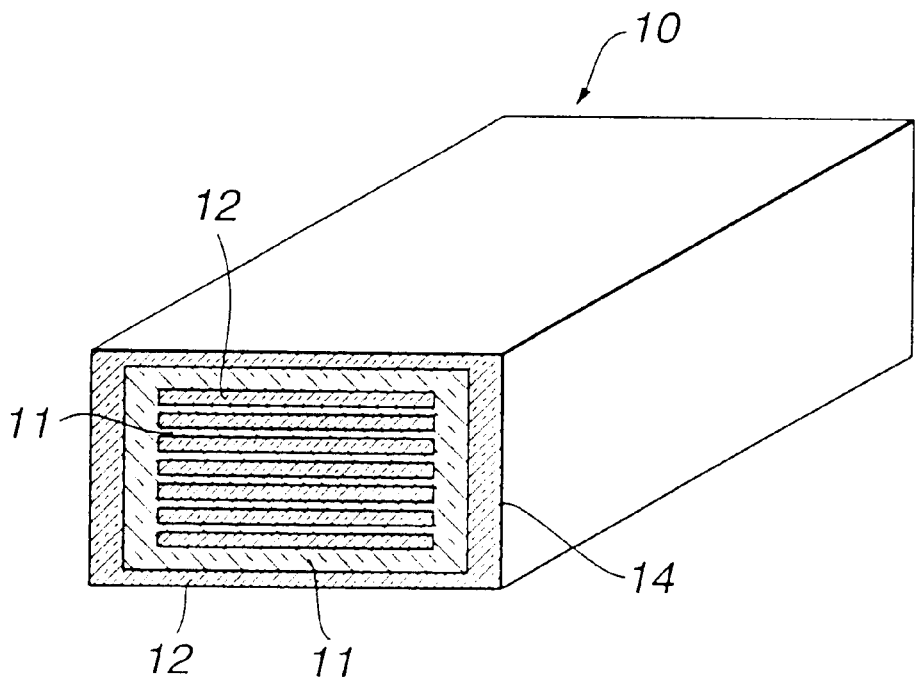

Example 5 is pertinent to the coloring structure 1 as shown in FIG. 1B. Using PEN of 1.63 refractive index as the first polymer 11 and Ny-6 of 1.53 refractive index as the second polymer 12, the alternate lamination of the polymers 11, 12 of 30 layers each is formed, which is surrounded by the double clad 14 of PEN and Ny-6. Thus, the brilliant member 10 as shown in FIG. 3B is obtained, which produces blue as an interference color and wherein the thickness da of the first polymer 11 is equal to 0.072 µm, and the thickness db of the second polymer 12 is equal to 0.077 µm. The dimensional ratio of the brilliant member 10 is determined such that suppose that the length A of the side perpendicular to the surface of the alternate lamination of the polymers 11, 12 is 1, the length B of the side parallel to the surface is between 4 and 5, and the length L is between 15 and 20.

In the same way as Example 1, paint is prepared by mixing the brilliant members 10 in the two-liquid acrylic-urethane base paint known under the trade name of "R-241 Base" manufactured by NIPPON BEE CHEMICAL, CO., LTD. to have 10 weight % with respect to the entire coating film. The paint prepared in such a way is diluted with the acrylic-urethane thinner known under the trade name of "T-801 Thinner" manufactured,by NIPPON BEE CHEMICAL, CO., LTD. to have an about 11–12 sec. viscosity in terms of Ford cup #4. The diluted paint is applied on a PET film having 200 µm thickness and 87% average transmittance in the visible-light region and cleaned with isopropyl alcohol to have a 15–20 µm thickness, which is subjected to baking during 20 min. at 80° C. to form the surface layer 20 placed on the PET film as the base 30 with light transparency and containing the brilliant members 10, obtaining the coloring structure 1 as shown in FIG. 1A.

The brilliant members 10 of 20 weight % and polyethylene pellets are injected into an injection molding machine, obtaining a 1 mm thickness polyethylene sheet as shown in FIG. 16, which produces a blue interference color.

Evaluations

The coloring structures 1 of Examples 1–5 are evaluated with regard to the following items. The results of the evaluations are given in Table 1.

1) Appearance

Appearance is evaluated visually.

2) Tone

Tone is evaluated based on the reflection-spectrum measurement by a three dimensional calorimeter and the chromaticity coordinates.

3) Depth

Depth is evaluated in accordance with a method introduced in the paper entitled "Depth Perception and Accommodation of The Human Eye" published at the 5th Symposium on Human Interface held on Oct. 25–27, 1989 in Kyoto. It is noted that in Table 1, the cell with X designates that depth is not effective, the cell with ○ designates that depth is effective, and the cell with ◎ designates that depth is highly effective.

4) Adhesion

Adhesion is evaluated visually.

TABLE 1

| Items | Example 1 | Example 2 | Example 3 | Example 4 | Example 5 |
| --- | --- | --- | --- | --- | --- |
| Appearance | uniform | uniform | uniform | uniform | uniform |
| Tone |  |  |  |  |  |
| seeing from incident side | blue | yellow | pale yellow | cyan | pale yellow |
| seeing from other side | orange | orange | pale range | yellow orange | pale range |
| Depth | ○ | ○ | ○ | ◎ | ◎ |

TABLE 1-continued

| Items | Example 1 | Example 2 | Example 3 | Example 4 | Example 5 |
| --- | --- | --- | --- | --- | --- |
| Adhesion | no peeling | no peeling | no peeling | no peeling | no peeling |

From the results given in Table 1 it is confirmed that all the coloring structures 1 of Examples 1–5 provide uniform appearance, depth, and a hue difference between when seeing the coloring structure 1 from the side of an incident-light source and when seeing it from the side opposite thereto. Moreover, it is confirmed that remarkable depth is obtained with regard to the coloring structure 1 of Example 4 including two surface layers 20a, 20b, and that of Example 5 having relatively great thickness (1 mm) and including the base 40 dispersedly containing the brilliant members 10.

The entire contents of Japanese Patent Applications P11-050491 filed Feb. 26, 1999 and P10-350985 filed on Dec. 10, 1998, and the paper entitled "Depth Perception and Accommodation of The Human Eye" published at the 5th Symposium on Human Interface held on Oct. 25–27, 1989 in Kyoto are incorporated herein by reference.

Having described the present invention with regard to the preferred embodiments or examples, the present invention is not limited thereto, and various modifications and changes can be made without departing from the scope of the present invention.

What is claimed is:

1. A coloring structure for producing colors by reflection, interference and transmission of a light incident thereon, comprising:

a base with light transparency;

a layer placed on at least part of said base; and a plurality of transparent brilliant members dispersedly contained in said layer in a predetermined concentration, each brilliant member including an alternate lamination of at least two polymers having different refractive indexes, said alternate lamination producing an interfered light resulting from reflection and interference of the light and a transmitted light resulting from transmission of the light, each brilliant member controlling said interfered light and said transmitted light, whereby the coloring structure is provided with a coloring mechanism for producing at least an interference color resulting from said interfered light, a first transmitted color resulting from said transmitted light, and a second transmitted color resulting from transmission of light which has passed through said base and said layer without striking any brilliant members.

2. The coloring structure as claimed in claim 1, wherein said predetermined concentration of said brilliant members is 0.1–30.0% by weight.

3. The coloring structure as claimed in claim 1, wherein said brilliant members are spaced to allow direct transmission of the light through the coloring structure.

4. The coloring structure as claimed in claim 3, wherein said alternate lamination of each brilliant member includes a layer containing one of achromatic matter and chromatic matter.

5. The coloring structure as claimed in claim 4, wherein each brilliant member includes a clad arranged around said alternate lamination, said clad being formed out of one of said two polymers, a polymer other than said two polymers, land a combination of said polymers.

6. The coloring structure as claimed in claim 5, wherein each brilliant member is of a substantially rectangular section, wherein a ratio of the length of a side of said section perpendicular to a surface of said alternate lamination to the length of a side of said section parallel to said surface of said alternate lamination is between 0.8 and 25.0, and said ratio of the length of said side of said section to the length of each brilliant member is between 0.8 and 4,000.

7. The color structure as claimed in claim 1, further comprising at least one other layer placed on said layer, said at least one other layer containing said brilliant members.

8. The coloring structure as claimed in claim 7, wherein said brilliant members contained in said layer and said other layers produce different interference colors.

9. The coloring structure as claimed in claim 7, further comprising an outermost layer with light transparency.

10. A coloring structure for producing colors by reflection, interference and transmission of a light incident thereon, comprising:

a base with light transparency; and a plurality of transparent brilliant members dispersedly contained in said base in a predetermined concentration, each brilliant member including an alternate lamination of at least two polymers having different refractive indexes, said alternate lamination producing an interfered light resulting from reflection and interference of the light and a transmitted light resulting from transmission of the light, each brilliant member controlling said interfered light and said transmitted light, whereby the coloring structure is provided with a coloring mechanism for producing at least an interference color resulting from said interfered light, a first transmitted color resulting from said transmitted light, and a second transmitted color resulting from transmission of light which has passed through said base and said layer without striking any brilliant members.

11. The coloring structure as claimed in claim 10, wherein said predetermined concentration of said brilliant members is 0.1–30.0% by weight.

12. The coloring structure as claimed in claim 10, wherein said brilliant members are spaced to allow direct transmission of the light through the coloring structure.

13. The coloring structure as claimed in claim 12, wherein said alternate lamination of each brilliant member includes a layer containing one of achromatic matter and chromatic matter.

14. The coloring structure as claimed in claim 13, wherein each brilliant member includes a clad arranged around said alternate lamination, said clad being formed out of one of said two polymers, a polymer other than said two polymers, and a combination of said polymers.

15. The coloring structure as claimed in claim 14, wherein each brilliant member is of a substantially rectangular section, wherein a ratio of the length of a side of said section perpendicular to a surface of said alternate lamination to the length of a side of said section parallel to said surface of said alternate lamination is between 0.8 and 25.0, and said ratio of the length of said side of said section to the length of each brilliant member is between 0.8 and 4,000.

16. The coloring structure as claimed in claim 10, further comprising at least one other layer placed on said base, said at least one other layer containing said brilliant members.

17. The coloring structure as claimed in claim 16, wherein said brilliant members contained in said layers produce different interference colors.

18. The coloring structure as claimed in claim 17, further comprising an outermost layer with light transparency.

\* \* \* \* \*